United States Patent
Zhou et al.

(10) Patent No.: US 6,908,873 B2
(45) Date of Patent: *Jun. 21, 2005

(54) REGENERATION OF SPENT SUPPORTED METAL CATALYSTS

(75) Inventors: Bing Zhou, Cranbury, NJ (US); Michael Rueter, Plymouth Meeting, PA (US)

(73) Assignee: Headwaters Nanokinetix, Inc., Lawrenceville, NJ (US)

(*) Notice: Subject to any disclaimer, the term of this patent is extended or adjusted under 35 U.S.C. 154(b) by 249 days.

This patent is subject to a terminal disclaimer.

(21) Appl. No.: 10/326,042

(22) Filed: Dec. 20, 2002

(65) Prior Publication Data

US 2003/0216245 A1 Nov. 20, 2003

Related U.S. Application Data

(63) Continuation-in-part of application No. 09/745,510, filed on Dec. 22, 2000, now Pat. No. 6,740,615.

(51) Int. Cl.[7] .......................... B01J 20/34; B01J 38/62; B01J 38/50; B01J 38/56

(52) U.S. Cl. ............................. 502/29; 502/28; 502/31
(58) Field of Search ............................. 502/29, 28, 31, 502/261–263, 327, 332–334, 339, 355, 415, 439

(56) References Cited

U.S. PATENT DOCUMENTS

| | | | | |
|---|---|---|---|---|
| 4,366,085 A | * | 12/1982 | Ikegami et al. | ............. 502/155 |
| 4,999,326 A | * | 3/1991 | Sikkenga et al. | ............. 502/30 |
| 6,005,155 A | * | 12/1999 | Sun | ............................ 585/640 |
| 6,239,054 B1 | * | 5/2001 | Shukis et al. | ................. 502/29 |

* cited by examiner

*Primary Examiner*—Cam N. Nguyen
(74) *Attorney, Agent, or Firm*—Workman Nydegger

(57) ABSTRACT

A method for regenerating spent supported metal catalysts comprising treating the spent catalyst with an organo-metallic complex forming agent having an ionization constant $pK_1$ of at least 2.5. The catalyst activity is restored to an activity level near to or greater than the fresh catalyst. The regeneration method is particularly useful for regenerating spent palladium catalysts on an alumina support as utilized for the hydrogenation of ethyl anthraquinone (EAQ) in the production of hydrogen peroxide.

25 Claims, 1 Drawing Sheet

FRESH CATALYST

SPENT CATALYST

CATALYST AFTER BURNOUT AT 850°F

REGENERATED CATALYST

LEGEND:
ooooo Pd PARTICLES
⌒⌒⌒ ORGANIC DEPOSITS

SCHEMATIC PRESENTATION OF CATALYST SURFACES  HT-15C1P

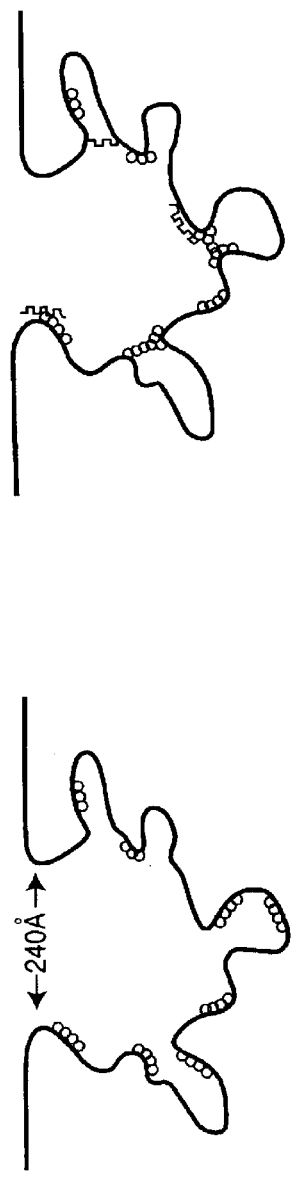
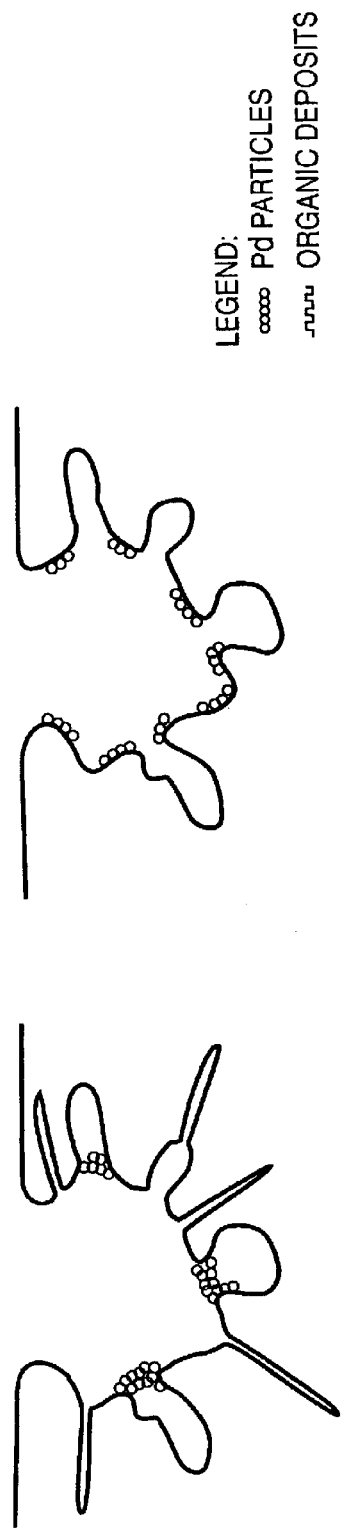
Fig-1
FRESH CATALYST
FIG. 1a
SPENT CATALYST
FIG. 1b
CATALYST AFTER BURNOUT AT 850°F
FIG. 1c
REGENERATED CATALYST
FIG. 1d
LEGEND:
○○○○ Pd PARTICLES
∿∿∿ ORGANIC DEPOSITS
SCHEMATIC PRESENTATION OF CATALYST SURFACES HT-15CIP

REGENERATION OF SPENT SUPPORTED METAL CATALYSTS

RELATIONSHIP TO PENDING APPLICATIONS

This application is a continuation-in-part of U.S. patent application Ser. No. 09/745,510, filed Dec. 22, 2000 now U.S. Pat. No. 6,740,615.

FIELD OF THE INVENTION

1. The invention relates to the regeneration of spent supported metal catalysts including metals comprising noble metals and metals generally described as non-noble metals. The support material for the metal catalyst may comprise any solid material useful as a catalyst support. The invention particularly relates to a process for regenerating spent supported noble metal catalysts; but especially palladium catalysts utilized for the hydrogenation of ethyl anthraquinone (EAQ) for producing hydrogen peroxide (H2O2) product. The regenerated catalyst activity levels of the catalyst of the invention are near or greater than those of the fresh catalyst.

BACKGROUND OF INVENTION

2. The conventional production of hydrogen peroxide product involves a two-step process in which a hydrogen donor solvent, ethyl anthraquinone (EAQ), is first hydrogenated and then oxidized with oxygen to form the hydrogen peroxide product. In some hydrogen peroxide manufacturing facilities, the hydrogenation step is carried out in a fixed bed reactor utilizing a palladium-on-alumina or similar catalyst. A typical catalyst may contain 0.28 to 0.33 wt % palladium on a large pore alumina support. The useful life expectancy of the catalyst is about two years, after which its activity drops to about 30% of its original (fresh catalyst activity) condition or level. It is believed that this catalyst deactivation is caused by deposition of high molecular weight organic materials formed from the polymerization of EAQ on the active sites of the catalyst, and/or by gradual agglomeration of the palladium to larger particles or clusters on the catalyst. Spent palladium/alumina catalysts are presently being regenerated using a simple "wash-burn" procedure, in which the catalyst is first extracted with an organic solvent to remove any soluble material deposits; then, the spent catalyst is subjected to a controlled carbon burn-out step at about 850° F. temperature in air. The high temperature regeneration treatment may also promote undesirable agglomeration of the palladium to larger particles on the catalyst support. Thus, it is difficult to successfully regenerate the used catalyst back to near 100% of its original activity. In fact, the simple wash-burn procedure can usually restore the used catalyst to only about 70% of its original or fresh activity level. Such "wash-burn" catalyst regeneration procedures have been disclosed by various U.S. and foreign patents. For example, U.S. Pat. No. 4,148,750 to Pine discloses a process for redispersal of noble metals on used supported zeolite-containing catalysts. U.S. Pat. Nos. 4,454,240 and 4,595,666 to Ganguli disclose method steps for regenerating used catalysts by dilute acid treatment to remove undesired metal deposits followed by carbon burn-off at increased temperature levels. Also, U.S. Pat. No. 5,188,996 to Huang et al discloses redispersion of noble metal such as platinum on low acidity support such as silica by contacting with chlorine and oxygen at low pressures.

An overall objective of the present invention is to overcome the limitations inherent in prior art spent catalyst regeneration processes and provide a process that will restore spent catalyst activity to a level at or near that of fresh metal-on-solid support catalyst. A further objective of the invention is to provide a regeneration process with the foregoing capabilities that will be applicable generically to spent solid supported metal catalysts, regardless of composition. A particular objective is to improve the economics of the hydrogen peroxide production process by increasing the activity and service life of the palladium/alumina catalyst, as well as that of other similar supported noble metal catalysts.

Based on an understanding at the molecular level of the apparent catalyst reaction and deactivation mechanism, the surface structure of the catalyst support material, and the exposition of palladium crystal clusters thereon, an effective procedure has been developed for regenerating and enhancing used palladium/alumina catalyst to an activity level significantly higher (90% or more) than that achieved by the current "wash-burn" procedure. The procedure is applicable to catalysts comprising both noble and non-noble metal-on solid support wherein the solid support comprises any solid material useful as a support for solid metal catalysts.

SUMMARY OF INVENTION

A method or process has been discovered for regenerating spent catalyst comprising metal-on-solid support which returns the spent catalyst to an activity level close to or even greater than the activity level of the fresh catalyst. The method is applicable to any metal catalyst employed in combination with any metal catalyst support familiar to those skilled in the art. Through an appreciation of the mechanisms of the catalyst deactivation events occurring at the molecular level on the catalytic surface of a metal-on-solid support catalyst, it has been discovered that when spent catalyst particles are treated with an organo-metallic complex forming agent the catalytic activity of the spent catalyst can be restored in whole or substantially in part. Suitable organo-metallic complexing agents polymeric chemicals and preferably small, polyfunctional organic molecules containing at least one carboxylic acid group and exhibiting a $pK_1$ of at least 2.5. Typically, the preferred agents contain other functional groups including hydroxyl and amino groups.

Although treatment of the spent catalyst particles with organo-metallic complex forming agents is essential in the instant process to achieve strong catalyst reactivation, the treatment may also include other steps such as solvent washing of the spent catalyst or drying and calcining of the spent catalyst, typically applied before treatment with organo-metallic complex forming agents.

For the fresh catalyst, the support material may comprise any catalyst support material known in the art. Preferably noble metal are used for hydrogen peroxide production. The noble metals include palladium (Pd), platinum (Pt), gold (Au), iridium (Ir), osmium (Os), rhodium (Rh), rhenium (Re), or ruthenium (Ru), or combinations thereof, with palladium usually being preferred. The invention is particularly useful for regenerating and enhancing used supported palladium (Pd) catalyst, such as that utilized for hydrogenation of ethyl-anthraquinone (EAQ) for producing hydrogen peroxide ($H_2O_2$) product.

In the manufacture of hydrogen peroxide using EAQ, the catalyst is a noble metal on alumina support. The alumina has a surface area of 20–600 m2/gm and pore diameters within the range of 50–600 Angstroms, with 50–500 m2/gm and 100–400 Angstroms being preferred.

The used catalyst regeneration method of this invention includes the following basic step:

contacting the spent catalyst with a suitable organic treating agent selected for forming an organo-metallic complex for breaking down large noble metal agglomerates on the used catalyst to smaller metal particles, and redistributing the smaller noble metal(s) particles on the catalyst support. Suitable catalyst treating agents should have an ionization constant $pK_1$ greater than about 2.5.

A preferred method also includes the following additional steps carried out before the treatment of the spent catalyst with the organo-metallic complexing agent:

cleaning the used supported noble metal catalyst by solvent extraction for removal of process contaminants and adsorbed chemicals from the used catalyst by contact with suitable organic solvent(s);

drying and calcining the cleaned used catalyst to remove any polymer deposits remaining on the catalyst.

The organic solvents suitable for the used catalyst cleaning method can be alcohols such as methanol, amines, ketones, or similar organic compounds utilized at cleaning conditions of 0–200° C. temperature and 1 to 50 atm. pressure for 2–8 hours. Preferred solvent cleaning conditions are 10–100° C. temperature and 1–20 atm. pressure for 4–6 hours. Suitable catalyst drying and calcining conditions for the method step (2) are heating the catalyst in air at 100–120° C. for 1–8 hours for the drying, then further heating it in air at 200–600° C. (392–1112° F.) temperature for 1–24 hours for the calcining step. Calcining the dried catalyst at lower temperatures and longer time periods within these ranges is usually preferred for economic reasons.

The organo-metallic complex forming agents suitable in the instant invention may be taken from small, polyfunctional, non-polymeric chelate-forming chemicals or from oligomeric or polymeric polyfunctional chelate-forming chemicals. The organo-metallic complex forming chemical treating agents suitable for the noble metal redistribution method are chemical compounds wherein, the treating agent exhibits an ionization constant $pK_1$ of at least about 2.5, Examples of organo-metallic complex forming chemical treating agents, some of which are useful in the present invention, and their corresponding ionization constants $pK_1$ are as follows:

| Treating Agent | pK1 |
|---|---|
| Oxalic Acid | 1.27 |
| EDTA | 2.01 |
| Citric Acid | 3.13 |
| Glycolic Acid | 3.63 |
| Succinic Acid | 4.21 |
| Glycine | 9.78 |
| Salicylic Acid | 13.12 |

Oxalic acid having a $pK_1$ of 1.27 and ethylene diaminotetraacetic acid (EDTA) having a $pK_1$ of 2.01 are outside the desired range, and are thereby not suitable for providing desired organo-metallic complexes for this invention. Also, EDTA has been shown to remove aluminum from zeolites by a chelation effect which can thereby render zeolite supports ineffective by deactivating the support. Useful reaction conditions for forming the organo-metallic complexes and for redistributing the noble metal particles are 10–500° C. temperature and 1–10 atm. pressure for 1–8 hours, with 20–450° C. temperature and 1–5 atm. pressure for 2–6 hours being preferred. For best results, the organic treating agent should preferably be maintained in its liquid phase; however a liquid/vapor phase mixture having only a small portion of vapor may be utilized.

By utilizing the catalyst regeneration method and procedure according to this invention, it is proved experimentally that used palladium (Pd) catalyst supported on alumina can be better cleaned for removal of the process contaminants and polymer deposits, and thus expose more catalyst surface and active Pd sites to a process reactant. Catalyst activity tests have also shown that used supported Pd catalysts regenerated by the method of this invention have their activity significantly increased to at least about 80% and preferably up to 93%–103% of fresh catalyst activity level, compared to only about 70% of fresh catalyst activity after being regenerated by known traditional "wash-burn" regeneration procedures. This regeneration method is particularly useful for used supported catalysts containing 0.2–0.4 wt. % palladium deposited on a support of alumina or silica, as utilized for producing hydrogen peroxide (H2O2) by hydrogenation of ethyl-anthraquinone (EAQ).

Advantages provided by the catalyst regeneration method and procedure of this invention include its ability to not only effectively remove contaminants and organic deposits from the used noble metal catalyst, but also to break apart and redistribute the active noble metal molecules such as palladium in the pores of the catalyst support. This new catalyst regeneration method and procedure not only cleans the contaminated catalyst surface, but also improves the exposition and distribution of the noble metal(s) such as palladium on the catalyst support. The regeneration procedure can restore catalyst activity to 100% or more of the fresh catalyst standard, and the resulting molar selectivity ratio of desired product to side products is 190:1, which is a better molar selectivity ratio than that achieved for fresh catalyst (150:1). This catalyst regeneration procedure and method is considered useful for regenerating supported noble metal catalysts containing other noble metals instead or in addition to palladium. After such used catalyst regeneration, the process reactants have improved contact with the catalyst active metal(s) particles and thereby enhance the activity and product selectivity of the catalyst.

BRIEF DESCRIPTION OF DRAWINGS

FIGS. 1(a)–1(d) show schematic illustrations of typical deposition of noble metal(s) such as palladium in the pores of the support for fresh, spent and regenerated supported palladium catalysts, respectively.

DETAILED DESCRIPTION OF INVENTION

In general, the invention relates to the reactivation or regeneration of spent supported metal catalysts. The method is based on the use of a metal complexing agent, which is an organic compound having the ability to form organo-metallic complexes with the catalytic metal components of a supported catalyst. By forming these complexes, the metal complexing agent causes the catalytic metal components of a supported spent catalyst to be rearranged on the surface of the catalyst support.

The utility of the rearrangement process derives from the typical physical structure of spent (deactivated) catalysts. Frequently, the active metal components of supported catalysts have undergone agglomeration or sintering during use, such that metal particles that were originally small in size for the fresh catalyst become much larger for the deactivated catalyst. This leads to a drop in active surface area and a corresponding loss in activity.

In the present invention, the regeneration method allows most or all of the lost activity to be recovered. In the process of forming organo-metallic complexes, the large metal particles on the support surface are broken up. The metals are redeposited or rearranged as smaller particles, with some even smaller than in the original fresh catalyst. This allows the activity of the catalyst to be recovered at least to activity levels that are a large percentage of the original catalytic activity, and in some cases to levels that can even equal or exceed the catalytic activity of the fresh catalyst.

In the parent patent application to which this invention is related, the use of the method of the invention was disclosed to regenerate supported noble metal catalysts, where the noble metal is platinum, palladium, gold, osmium, iridium, rhodium, ruthenium, and combinations thereof and where the support for the catalyst is alumina. As disclosed herein, It has been discovered that the regeneration method is useful for other catalysts and support material, as follows:

A. Applicable Catalysts and Support Material

1. The regeneration method is useful for supported catalysts where the solid support comprises any solid material useful as a catalyst support. This support may be porous or non-porous. It may be used in the form of so-called structured materials, such as structured packing, which may be in the form of controlled shapes such as rings, saddles, or other shapes, or may be in the form of larger structures, examples of which include structured packings commonly used for distillation and other phase contacting equipment which involve the use of regular geometric arrangements of convoluted surfaces. Supports may also be in the form of firms, membranes, coatings, or other mainly two-dimensional structures. Supports may also be in the form of mainly spherical particles (i.e. beads).

The catalyst support may comprise oxide materials, including but not limited to alumina, silica, titania, kieselguhr, diatomaceous earth, bentonite, clay, zirconia, magnesia, as well as the oxides of various other metals, alone or in combination. They also include the class of porous solids collectively known as zeolites, which have ordered porous structures. The catalyst support may comprise carbon-based materials, including but not limited to carbon black, activated carbon, graphite, fluoridated carbon, and the like, or combinations thereof. The catalyst support may comprise organic solids, such polymers, including the polymer membranes which are used in the electrodes of fuel cells., and polymeric or resinous particles such as are used as ion exchange resins or adsorbents. The catalyst support may comprise a metal or metal alloy.

2. The regeneration method is useful for regeneration of spent supported metal catalysts where the supported catalytic particles comprise a noble metal, where the noble can be platinum, palladium, rhenium, gold, osmium, iridium, rhodium, ruthenium, and combinations thereof.

3. The regeneration method is useful for regeneration of spent supported catalysts where the supported catalytic particles comprise, in whole or in part, catalytic components other than noble metals. These can include catalytic metals including but not limited to nickel, copper, iron, cobalt, zinc, silver, chromium, vanadium, titanium, molybdenum, tungsten, manganese, scandium, or combinations thereof. They can include other (non-transition) metals including but not limited to aluminum, gallium, indium, tin, antimony, lead, bismuth, or combinations thereof. They can include alkali or alkali earth metals including but not limited to sodium, potassium, lithium, beryllium, calcium, magnesium, or combinations thereof. They can include rare-earth metals (lanthanides or actinides) including but not limited to lanthanum, cerium, or combinations thereof. They can include non-metals or semi-metals including but not limited to boron, carbon, nitrogen, oxygen, fluorine, phosphorus, silicon, sulfur, chlorine, germanium, arsenic, selenium, bromine, tellurium, iodine, or combinations thereof.

B. The Regeneration Method with Complexing Agents

The required method for catalyst regeneration of the subject invention is contacting a spent or used catalyst with a complex forming agent. The complex forming agent is a chemical compound defined by its ability to form complexes with the supported catalytic components of the spent catalyst. In the case of catalysts where the supported catalytic material is composed predominantly of a metal or metals, the preferred complexing agent is a chelating agent capable of forming a strong organo-metallic complex called a chelate.

The complexing agent breaks up catalytic particles on the surface of the support, and redistributes or rearranges the catalytic components to form a new supported catalyst structure that is characterized by smaller catalytic particles. These smaller particles may also be of more uniform size, and/or more uniformly distributed that those on the spent catalyst, although this is not essential.

Useful complexing agents include but are not limited to:

a. Mono, di and tribasic aliphatic and aromatic carboxylic acids, hydroxy carboxylic acids, amino carboxylic acids and organo sulfonic acids including glycolic acid, malonic acid, tartaric acid, citric acid, succinic acid, glutaric acid, glycine, salicylic acid, isophthalic acid, 2-aminobenzoic acid and the like, and their salts.

b. Polymers and copolymers, including polyacrylates and methacrylates, polyvinybenzoates, polyvinylsulfate, polyvinyl sulfonates, polybiphenol carbonates, polybenzimidazoles, polyvinylpyrrolidone, polypyridines, and the like.

c. Aliphatic and aromatic amino compounds, including ethylene diamine, propylene diamine, diethylenetriamine, triethylenetetraamine, diethylenetriamine pentaacetic acid (DTPA), N-(hydroxyethyl)-ethylenediaminotriacetic acid (HEDTA), and the like, and their salts.

d. Phosphonate compounds, such as those marketed under the Dequest brand by Solutia, including amino tri (methylanephosphonic acid) (ATMP), 1-Hydroxy-1, 1diphosphonic acid (HEDP), diethylenetriamine penta (methylphosphonic) acid, and the like, and their salts.

The process conditions for forming the organo-metallic complexes of spent supported catalytic metals include a temperature of 0° C. to 500° C., and a mole ratio of spent catalytic metal particles to complexing agent of 1:100 to 100:1. The preferred operating conditions include a temperature of 50–500° C. at atmospheric pressure. The spent catalytic metal particles are treated with the organic complexing agent with the complexing agent preferably dissolved in water or other solvents such as methanol, glycolic acid and acetic acid, or any solvent that can dissolve the organo-metallic complexing agent. The treatment time is preferably about 5 hours, or between one and 10 hours. Following treatment, the regenerated catalyst is separated from residual complexing agent by conventional means. The regenerated catalyst may be recovered and used directly in the catalytic process without further treatment. Depending upon the chemistry of the process in which the regenerated supported metal catalyst is being used, e.g., EAQ hydrogenation, the regenerated catalyst can be used in that process without resorting to the separation of the regenerated catalyst from the organic complexing agent mixture.

Optionally, the spent catalyst may also be subjected to other processing steps, either before or after the complexing agent treatment step. These other steps can include but are not limited to washing with a liquid solvent, filtration, drying, calcination, or reduction, or combinations thereof.

The method for the regeneration of spent supported metal catalyst particles of the invention comprises contacting the spent particles with a suitable organic treating agent to form an organo-metallic complex on the catalyst under conditions sufficient to break down large catalyst particle clusters whereby the resulting smaller particles are redistributed in the pores of the support material by contact with the organo-metallic complex forming agent. The organometallic complexing agent preferably has an ionization constant $pK_1$ of greater than 2.5. Suitable treating agent contacting conditions are 10–500° C. temperature at 1–10 atm. pressure for 2–8 hours.

The catalyst overall regeneration method and procedure developed for the used supported noble metal catalysts, such as palladium (Pd) catalyst on alumina support, may include the following specific steps:

cleaning the used supported Pd catalyst having organic deposits by contact with a selected liquid cleaning solvent such as methanol at 0–200° C. temperature and 1–50 atm. pressure to dissolve and substantially remove the organic deposits from the catalyst;

drying the used catalyst at 100–120° C. temperature for 1–8 hours to remove the cleaning solvent from the catalyst;

calcining the cleaned catalyst in air at 200–600° C. temperature for 1–24 hours to remove any remaining organic deposits from the catalyst;

adsorbing a suitable organic treating agent selected for forming an organo-metallic complex on the catalyst, and breaking down large Pd particle clusters and relocating or redistributing the resulting smaller palladium particles in pores of the support material by contact with the organo-metallic complex forming agent liquid and vapor, such as glycolic acid having ionization constant $pK_1$ of 3.63.

When utilizing the supported palladium on alumina catalyst for producing hydrogen peroxide product from ethyl anthraquinone (EAQ), the critical diameter of intermediate EAQ:H2 dimer molecules is about 120 Å. Therefore, the ideal pore diameter of the alumina support should be at least about 1.5 and preferably about 2.0 times that of the dimer molecules, i.e. at least about 180 Å and preferably at least 240 Å, so as to allow free movement of the reactant dimer from the adsorbed site on the catalyst. During the used catalyst regeneration, it is desirable to break up Pd particle clusters from pores having diameter smaller than about 180 Å, and relocate the resulting smaller palladium particles into pores having diameters larger than about 180 Å. It is also desirable to avoid depositing the Pd particles into the catalyst pores having a size smaller than about 180 Å. Thus, for this used palladium catalyst regeneration method, it is desirable to relocate the Pd particles from the pores smaller than about 180 Å into those pores larger than 180 Å, and preferably larger than 240 Å.

The four main reasons for the used supported Pd catalyst deactivation during hydrogenation of ethyl anthraquinone (EAQ) to produce hydrogen peroxide are: (1) contamination of the Pd catalyst by poisoning chemicals in the process feed or solvent; (2) coke deposition or large polymer molecule formation blocking the active Pd sites; (3) Pd particles agglomeration to form clusters; and (4) Pd leaching from the catalyst. The first three reasons for catalyst deactivation are at least partially reversible by regeneration, but the Pd loss by leaching is irreversible. After the palladium is lost from the catalyst, it is not possible to restore the catalytic activity to near its initial or original level, unless the palladium particle size after regeneration is smaller than that of fresh catalyst.

Experimental data have indicated some catalyst deactivation due to the first three listed reasons. Theoretical understandings of the reaction mechanism, catalyst structure and deactivation provide the basis for designing this improved catalyst regeneration method and procedure for used or spent supported noble metal catalysts, such as supported palladium catalysts. In order to regenerate the spent catalyst to a highly active and product selective state, the regeneration method preferably should achieve the following requirements:

solvent clean the used Pd catalyst surface to substantially remove its contaminants and organic deposits, breakdown the large Pd particles cluster on the catalyst to smaller particles, and relocate the smaller Pd particles from small pores to those having a diameter larger than about 180 Å.

Experimental results have shown that the first two goals were achieved, and it is believed that the third goal also was achieved, as the regenerated catalyst activity and selectivity results indicate that the Pd was redistributed or relocated to a desirable state on the catalyst support. Although theoretical consideration are not intended to limit the scope of the invention, when a suitable organo-metallic complex forming and redistributing agent such as glycolic acid is utilized, the following effects on the Pd particles are believed to occur: (1) The reaction between Pd clusters and glycolic acid treating agent breaks down the large Pd clusters to the smaller clusters and particles. (2) The glycolic acid agent helps to intercalate in between the Pd particles, thus allowing a more even distribution of these metal particles on the support. (3) The glycolic acid treating agent can also enter the pores smaller than 180 Å and react with Pd. When more Pd-glycolate complexes are formed, the pores are too small to hold all the complexes, and the Pd-glycolate material is sequentially squeezed out of pores smaller than 180 Å. After these Pd glycolates move into the larger pores, several Pd-glycolates will combine together by hydrogen bonding to form a large Pd-glycolate cluster, and this effect will prevent the Pd from depositing into the pores smaller than 180 Å.

The surface of typical fresh and spent supported palladium (Pd) catalysts, and catalyst regenerated according to this invention, are shown schematically in FIGS. 1(a)–1(d). As seen in FIG. 1(a), the surface of fresh catalyst is clean, and the Pd particles are deposited randomly in both small and large pores due to the catalyst traditional non-particle-size control preparation procedure. For the used or spent supported noble metal catalyst (FIG. 1b), due to the long term exposition of catalyst under the reaction conditions the Pd particles have agglomerated to form larger clusters, thereby at least partially blocking the catalyst small pores. The organic deposits are also formed on the Pd surface and alumina support, and can block more small pores. These effects result in a significant decrease of catalyst activity, surface area, and percentage of pores smaller than about 200 Å exposition.

Traditional catalyst regeneration methods involve heating to about 450° C. (842° F.) temperature for several hours can clean the catalyst surface (FIG. 1c). However, the sintering of Pd during such catalyst heating forms larger particles which block the entrance of many small pores of the support. The low surface exposition of large Pd particles results in limited access of reactants to the active Pd, thus leading to a less active catalyst than the fresh catalyst standard. FIG. 1d depicts the condition of the catalyst surface after regeneration wherein pore blockage has been reduced or removed and the surface exposition has been restored to that approximating the surface of fresh catalyst.

This invention will be further described by reference to the following example, which should not be construed as limiting the scope of the invention.

EXAMPLE

Samples of used supported palladium (Pd) on alumina catalyst, obtained from extended operations for hydrogenation of ethyl anthraquinone (EAQ) for producing hydrogen peroxide (H2O2) product, were regenerated utilizing the method of this invention. The used catalyst contained 0.2–0.4 wt. % palladium on alumina support. The used catalyst was first contacted with methanol solvent at 25° C. and ambient pressure for 3.3 hours, and then replaced with new methanol solvent three times with each time for 30 minutes (0.5 hour). Then the washed catalyst was dried in air at 110° C. for 2 hours, and then calcined in air at 400° C. for 4 hours. The calcined catalyst was then treated with glycolic acid agent at 400° C. and ambient pressure for 3 hours. The results obtained with the used catalyst that was regenerated by this procedure are shown in Table 1, and are depicted schematically in FIG. 1(d).

TABLE 1

Regeneration of Used Supported Palladium Catalyst

|  | Fresh | Used | Wash-Burn | Regenerated |
| --- | --- | --- | --- | --- |
| Catalyst Surface Area, m2/g | 82.6 | 80 | 76.7 | 88.1 |
| Pores Diameter < 240 Å, % |  | 9.5 |  | 13.0 |
| Desired Product/Side Product |  |  |  |  |
| Molar Ratio | 150:1 |  |  | 190.5 |
| Catalyst Activity Relative to Fresh |  |  |  |  |
| Catalyst, % | 100 | ~30 | 70 | 90–103 |

From the above results, it is noted that after the catalyst was cleaned by methanol solvent and re-generated by contact with glycolic acid treating agent, its surface area increased to 88.1 m2/g, which is desirably greater than that of the fresh catalyst standard (82.6 m2/g). The percentage of pores <240 Å also increased to 13.0% from 9.5% for the spent catalyst. These results indicate that the catalyst regeneration method of this invention not only cleans all the organic deposits from the used catalyst, but also clears the blockage of small pores in the support, which means that the large Pd particles on the used catalyst were broken down to smaller particles for the regenerated catalyst. Also, the increased surface area indicates that the Pd particle size is smaller than that of the fresh standard, and the particles are deposited mainly in the larger pores, otherwise the catalyst surface area would not increase significantly. This explanation is fully supported by the catalyst activity and selectivity test results.

Used catalyst regenerated by the method of the present invention has an activity close to or even exceeding 100% of the fresh catalyst standard. Because the spent catalyst had been used for years, some attrition of Pd from the support is unavoidable, but this new catalyst regeneration procedure restored the activity to near 100% or more of the fresh standard activity. This result indicates that for the regenerated catalyst the Pd active metal is being used more efficiently, e.g. the Pd is exposed on the catalyst surface in smaller particle size and at locations which are easy for process reactants to reach, i.e. in pores larger than about 240 Å diameter.

The molar ratio of desired $_{hydrogenation}$ product to side product after the catalyst regeneration (190:1) also exceeded that for the fresh catalyst standard (150:1). The high selectivity is apparently an effect of Pd deposited in pores >240 Å. As discussed above, to avoid over hydrogenation of $EAQ:H_2$ dimer and formation of the undesired product $EAQ:H_4$, one must try to minimize the time during which $EAQ:H_2$ remains at the adsorbed site, and this intermediate material must be removed as soon as possible. The critical diameter of intermediate $EAQ:H_2$ dimer is about 120 Å. Ideally, it should be avoided to deposit Pd into the catalyst pores that have a diameter smaller than 240 Å, and in which the free movement of the dimer is restricted and excess hydrogenation is unavoidable.

Although the invention has been described broadly and also in terms of specific preferred embodiments, it will be understood that modifications and variations may be made to the invention as defined within the scope of the following claims.

What is claimed is:

1. A method for regenerating a used supported metal catalyst, comprising:
    (a) providing a used metal catalyst comprising a support and at least one catalytically active metal comprising metal particle clusters attached to the support;
    (b) contacting the used supported metal catalyst with at least one organo-metallic complexing agent having an ionization constant $pK_1$ of at least about 2.5; and
    (c) breaking down the metal particle clusters and relocating the at least one catalytically active metal as smaller metal particles on the support to yield a regenerated supported metal catalyst.

2. The method of claim 1 wherein the catalytically active metal comprises one or more noble metals selected from the group consisting of supported palladium, platinum, rhenium, gold, osmium, iridium, rhodium, ruthenium, and combinations thereof.

3. The method of claim 1 wherein the catalytically active metal comprises one or more metals selected from the group consisting of nickel, copper, iron, cobalt, zinc, silver, chromium, vanadium, titanium, molybdenum, tungsten, manganese, scandium, aluminum, gallium, indium, tin, antimony, lead, bismuth, sodium, potassium, lithium, beryllium, calcium, magnesium, lanthanum, cerium, and combinations thereof.

4. The method of claim 1 wherein said supported metal catalyst further comprises one or more non-metals or semimetals selected from the group consisting of boron, carbon, nitrogen, oxygen, fluorine, phosphorus, silicon, sulfur, chlorine, germanium, arsenic, selenium, bromine, tellurium, iodine, and combinations thereof.

5. The method of claim 1 wherein said support comprises porous and/or nonporous supports selected from the group consisting of alumina, silica, titania, kieselguhr, diatomaceous earth, bentonite, clay, zirconia, magnesia, zeolites, carbon black, activated carbon, graphite, flouridated carbon, organic polymers, metals, metal alloys, and combinations thereof.

6. The method of claim 1 wherein the organo-metallic complexing agent comprises an organic chelating agent.

7. The method of claim 6 wherein said organic chelating agent comprises one or more aliphatic or aromatic mono, di, arid/or tribasic carboxylic acids.

8. The method of claim 7 wherein said aliphatic or aromatic mono, di, and/or tribasic carboxylic acids are selected from the group consisting of glycolic acid, malonic acid, tartaric acid, citric acid, succinic acid, glutaric acid, glycine, salicylic acid, isophthalic acid, 2-aminobenzoic acid, and their salts.

9. The method of claim 6 wherein said organic chelating agent comprises one or more polymers selected from the group consisting of polyacrylates, polymethacrylates, polyvinybenzoates, polyvinylsulfate, polyvinyl sulfonates, polybiphenol carbonates, polybenizimidazoles, polyvinylpyrrolidone, and polypyridines.

10. The method of claim 6 wherein said organic chelating agent comprises one or more of aliphatic or aromatic amino compounds selected from the group consisting of ethylene diamine, propylene diamine, diethylenetriamine, triethylenetetraamine, diethylenetriamine pentaacetic acid (DTPA), N-(hydroxyethyl)-ethylenediaminetriacetic acid (HEDTA), and their salts.

11. The method of claim 6 wherein said organic chelating agent comprises phosphonate compounds including amine tri(methylanephosphonic acid) (ATMP), 1-Hydroxy-1,1-diphosphonic acid (HEDP), diethylenetriamine penta (methylphosphonic) acid, and their salts.

12. The method of claim 1 where said organo-metallic complexing agent comprises one or more of an oligomeric or polymeric chelating agent containing one or more acid groups.

13. The method of claim 1 further comprising cleaning, drying and calcining the used catalyst before contacting the used catalyst with said organo metallic complexing agent.

14. The method of claim 1 wherein (b) is carried out at a temperature in a range of 0–400° C. and a pressure in a range of 0–10 atmospheres.

15. The method of claim 1 wherein (b) is carried out for a time period in a range of 1–8 hours.

16. A method for regenerating a used catalyst having supported metal catalyst particles comprising:
   a) calcining the used catalyst in air; and
   b) contacting the calcined catalyst from a) with at least one organo-metallic complexing agent, whereby the used catalyst is regenerated to a catalytic activity level in a range of 90–103% compared to fresh catalyst activity.

17. The method of claim 16 further including cleaning the used catalyst by contacting it with a solvent before calcining.

18. The method of claim 17 wherein the used catalyst is cleaned at a temperature in a range of 10–100° C. and a pressure in a range of 1–20 atmospheres for a time sufficient to clean the surface of the supported catalyst particles.

19. The method of claim 16 wherein the used catalyst is calcined in air at a temperature range of 350–500° C. for a time period in a range of 2–10 hours.

20. The method of claim 16 wherein the calcinced catalyst is contacted with at least one organo-metallic complexing agent at a temperature in a range of 20–400° C. and a pressure in a range of 1–5 atmospheres for a time sufficient to regenerate the catalyst.

21. The method of claim 16 wherein the organo-metallic complexing agent has a $pK_1$ of at least about 2.5.

22. The method of claim 16 wherein the supported metal catalyst particles comprise one or more noble metals selected from the group consisting of palladium, platinum, rhenium, gold, osmium, iridium, rhodium, ruthenium, and combinations thereof.

23. The method of claim 16 wherein said organo-metallic complexing agent is selected from the group consisting of aliphatic and/or aromatic mono, di, and/or tribasic carboxylic acids, polyacrylates, polymethacrylates, polyvinybenzoates, polyvinylsulfate, polyvinyl sulfonates, polybiphenol carbonates, polybenizimidazoles, polyvinylpyrrolidone, polypyridines, ethylene diaminc, propylene diaminc, diethylenetriamine, triethylenetctraamine, diethylenetriamine pentaccetic acid (DTPA), N-Qiydroxyethyl)-ethylenediaminetriacctic acid (HEDTA), amino tri(methylanephosphonic acid) (ATMP), 1-Hydroxy-1,1-diphosphonic acid (HEDP), diethylenetriamine penta (methylphosphonic) acid, their salts, and combinations thereof.

24. The method of claim 16 wherein the metal catalyst particles are attached to a catalyst support selected from the group consisting of alumina, silica, titania, keiselguhr, distomaceous earth, bentonite, clay, zirconia, magnesia, zeolites, carbon black, activated carbon, graphite, fluoridated carbon, organic polymers, metals, metal alloys, and combinations thereof.

25. A method for regenerating a spent supported metal catalyst comprising:
   contacting the spent supported metal catalyst with at least one organo-metallic complexing agent having an ionization constant $pK_1$ of at least about 2.5 under conditions sufficient to regenerate the spent supported metal catalyst,
   wherein the organo-metallic complexing agent comprises an organic chelating agent, wherein said organic chelating agent comprises:
   (i) one or more aliphatic or aromatic mono, di, and/or tribasic carboxylic acids selected from the group consisting of glycolic acid, malonic acid, tartaric acid, citric acid, succinic acid, glutaric acid, glycine, salicylic acid, isophthalic acid, 2-aminobenzoic acid, and their salts; and/or
   (ii) one or more phosphonate compounds including amine tri(methylanephosphonic acid) (ATMP), 1-Hydroxy-1,1-diphosphonic acid (HEDP), diethylenetriamine penta (methylphosphonic) acid, and their salts.

* * * * *

UNITED STATES PATENT AND TRADEMARK OFFICE
CERTIFICATE OF CORRECTION

PATENT NO. : 6,908,873 B2
DATED : June 21, 2005
INVENTOR(S) : Zhou et al.

It is certified that error appears in the above-identified patent and that said Letters Patent is hereby corrected as shown below:

Column 2,
Line 35, after "complexing agents" insert -- include --.
Line 50, change "noble metal" to -- noble metals --.

Column 5,
Line 41, change "such polymers," to -- such as polymers, --.
Line 43, change "cells.," to -- cells, --.
Line 48, after "the noble" insert -- metal --.

Column 8,
Line 22, change "consideration" to -- considerations --.

Column 9,
Table 1, reformat as shown below:

TABLE 1
Regeneration of Used Supported Palladium Catalyst

|  | Fresh | Used | Wash-Burn | Regenerated |
|---|---|---|---|---|
| Catalyst Surface Area, m2/g | 82.6 | 80 | 76.7 | 88.1 |
| Pores Diameter < 240 Å, % |  | 9.5 |  | 13.0 |
| Desired Product/Side Product Molar Ratio |  150:1 |  |  | 190.5:1 |
| Catalyst Activity Relative to Fresh Catalyst % | 100 | -30 | 70 | 90-103 |

UNITED STATES PATENT AND TRADEMARK OFFICE
CERTIFICATE OF CORRECTION

PATENT NO. : 6,908,873 B2
DATED : June 21, 2005
INVENTOR(S) : Zhou et al.

It is certified that error appears in the above-identified patent and that said Letters Patent is hereby corrected as shown below:

Column 11,
Line 46, before "range of 350-500°C." insert -- in a --.

Column 12,
Line 14, change "ethylene diaminc," to -- ethylene diamine, --.
Lines 14-15, change "propylene diaminc," to -- propylene diamine, --.
Line 15, change "triethylenetctraamine," to -- triethylenetetraamine, --.
Line 16, change "pentaccetic acid" to -- pentaacetic acid --.
Line 17, change "N-Qiydroxyethyl)" to -- (N-Hydroxyethyl) --.
Line 17, change "ethylenediaminetriacctic" to -- ethylenediaminetriacetic --.

Signed and Sealed this

Seventh Day of February, 2006

JON W. DUDAS
*Director of the United States Patent and Trademark Office*